US006449039B1

United States Patent
Bouzid

(10) Patent No.: US 6,449,039 B1
(45) Date of Patent: Sep. 10, 2002

(54) LASER SCANNING FLUORESCENCE MICROSCOPY WITH COMPENSATION FOR SPATIAL DISPERSION OF FAST LASER PULSES

(75) Inventor: Ahmed Bouzid, Madison, WI (US)

(73) Assignee: Thermo Noran Inc., Middleton, WI (US)

( * ) Notice: Subject to any disclaimer, the term of this patent is extended or adjusted under 35 U.S.C. 154(b) by 0 days.

(21) Appl. No.: 09/362,840

(22) Filed: Jul. 28, 1999

(51) Int. Cl.[7] .............................. G01J 3/30; G01J 1/58
(52) U.S. Cl. ..................................... 356/318; 250/458.1
(58) Field of Search ............................. 250/234, 458.1, 250/459.1; 300/300–334; 359/368, 385

(56) References Cited

U.S. PATENT DOCUMENTS

| 3,746,427 A | 7/1973 | Foster |
| 4,863,226 A | 9/1989 | Houpt et al. |
| 5,034,613 A | 7/1991 | Denk et al. |
| 5,225,924 A | 7/1993 | Ogawa et al. |
| 5,691,839 A | 11/1997 | Kobayashi |
| 5,862,287 A | 1/1999 | Stock et al. |

OTHER PUBLICATIONS

Winfried Denk, et al., "Two–Photon Laser Scanning Fluorescence Microscopy," Science, vol. 248, Apr. 6, 1990, pp. 73–76.

Winfried Denk, et al., "Two–Photon Molecular Excitation in Laser–Scanning Microscopy," Handbook of Biological Confocal Microscopy, Plenum Press, New York, 1995, Chapter 28, pp. 445–458.

Primary Examiner—F L Evans
Assistant Examiner—Zandra V. Smith
(74) Attorney, Agent, or Firm—Foley & Lardner

(57) ABSTRACT

In laser scanning microscope systems using short pulsed laser sources incorporating an acousto-optical deflector, compensation is provided for spatial dispersion introduced by the deflector. Spatial dispersion of short pulses, such as those provided by a laser utilized in two photon fluorescence microscopy, occurs due to the higher and lower wavelength components in the pulsed laser beam as the beam is passed through an acousto-optical deflector or other similar diffractive element. A dispersive prism is mounted adjacent to the exit face of the acousto-optical deflector to spatially recombine the components of the pulse. A mirror may be mounted adjacent to the input face of the acousto-optical deflector and adjusted to adjust the angle of incidence of the beam on the input face of the deflector to match the Bragg condition at the center wavelength and so that both sides of the spectrum of the pulses are somewhat Bragg-mismatched and attenuated.

33 Claims, 2 Drawing Sheets

LASER SCANNING FLUORESCENCE MICROSCOPY WITH COMPENSATION FOR SPATIAL DISPERSION OF FAST LASER PULSES

FIELD OF THE INVENTION

This invention pertains generally to the field of laser scanning microscopes and to laser scanning florescence microscopy.

BACKGROUND OF THE INVENTION

Laser scanning microscopes and particularly confocal microscopes are commonly used in research for the imaging of structures such as cells. In such scanning microscopes, the light from the laser source is focused to a point within the specimen by the microscope objective, and the specimen and beam are moved relative to one another, most commonly by deflecting the light beam so that it scans across a stationary specimen. The light from the specimen is collected by the objective and passed through the microscope to the detector, such as a photomultiplier tube. Various scanning systems have been developed to deflect the beam from the source to scan across the specimen, including pairs of galvanometer driven mirrors which provide both X and Y deflections of the beam. Because such mechanically driven mirrors provide relatively slow scanning of the beam, scanning systems have been developed which provide the deflections of the beam in at least one direction by faster devices, particularly acousto-optical deflectors (AODs). A confocal laser scanning microscope having fast scanning capability which incorporates an acousto-optical deflector is shown in U.S. Pat. No. 4,863,226 to Houpt, et. al.

Scanning microscopes can also be utilized to detect fluorescence induced by the illuminating light beam, which may be carried out concurrently with the detection of the light reflected from the specimen. In conventional fluorescence microscopy, the fluorophores incorporated in the specimen are selected to absorb the illumination light at a relatively short wavelength and to fluorescently emit photons at a longer wavelength. These fluorescent photons are passed back through the scanning optics to a dichroic mirror which separates the fluorescent light from reflected light and directs the fluorescent light to a detector such as a photomultiplier tube.

Various fluorophores can absorb two or more photons of relatively long wavelengths simultaneously when sufficiently intense illumination light is applied to them, and will fluorescently emit a photon at a shorter wavelength than the wavelength of the incident light. In two photon laser scanning microscopes an incident beam of relatively long wavelength light is provided in short pulses (typically in the range of a few picoseconds to a few hundred femtoseconds per pulse) from a laser. The pulsed beam from the laser is focused onto a specimen so that the light reaches an intensity at the focal point sufficient to excite detectable two photon fluorescence. The emitted fluorescent photons are collected by the objective lens of the microscope and are passed back through the optical system of the scanning microscope, either through the scanning optics to a dichroic mirror which reflects light at longer wavelengths while passing the shorter wavelength fluorescent light to a detector, or, by bypassing the scanning system and directing the light from the microscope objective lens to a dichroic mirror which passes the shorter wavelength fluorescent light directly to a detector. Such two photon systems are described in, e.g., Winfried Denk, et. al., "Two Photon Laser Scanning Fluorescence Microscopy," Science, Vol. 248, Apr. 6, 1990, pp. 73–76; Winfried Denk, et al., "Two-Photon Molecular Excitation in Laser-Scanning Microscopy," Chapter 28, Handbook of Biological Confocal Microscopy, Plenum Press, New York, 1995, pp. 445–448. If the incident light from the objective lens is focused to a narrow spot or waist in a semi-transparent specimen such that the intensity of the incident light is sufficient to excite multi-photon excitation only at the focal spot within the specimen, multi-photon fluorescence excitation will occur generally only in the focal plane. The fluorescent light emitted by the specimen can then be passed back and detected to obtain an image corresponding only to the focal plane and not to structures above and below the focal plane.

The laser light sources that are utilized to provide two (or more) photon excitation are generally selected to provide very short pulses of laser light, with a typical pulse width from a few picoseconds to several hundred femtoseconds. At such narrow pulse widths, the pulse modulation of the relatively long wavelength (substantially monochromatic) laser light effectively introduces higher and lower frequency components or sidebands in the pulse modulated light beam. The occurrence of such spectral spread may also be explained based on the uncertainty principle, which predicts that the shorter the temporal extent of the pulse, the wider its spectral content, regardless of how the pulse is produced. Thus, the spectral content of, e.g., a femtosecond ($10^{-15}$ second) pulse is significantly larger than that of a picosecond ($10^{-12}$ second) pulse. When beams with such narrow pulse widths are passed through an acousto-optic deflector (AOD), a diffractive element, the various wavelengths within the pulse modulated light tend to be spatially separated from one another by the AOD element. Such spatial dispersion of the pulses reduces the quality of the fluorescence image that can be obtained from such scanning systems.

SUMMARY OF THE INVENTION

In accordance with the present invention, a laser scanning microscope system utilizing short pulsed laser sources incorporates an acousto-optical deflector with compensation for spatial dispersion introduced by the deflector. In accordance with the invention, spatial dispersion of the pulses passed through the deflector is compensated by spatially compressing the pulses passed through the deflector to provide a spatially recombined pulse to the microscope optics.

In a laser scanning microscope system in accordance with the invention, pulsed laser light from a source is provided on an optical path defined by optical elements to the objective lens of microscope which focuses the laser light onto a specimen. The optical elements of the optical path include an acousto-optical deflector (or other chromatically dispersive scanning element) for deflecting the laser light selectively in one of the X or Y directions with respect to the specimen and a second deflector, such as a galvanometer driven mirror, to deflect the light in the other direction. Multi-photon fluorescent light emissions from the specimen are collected and directed to a fluorescent light detector, such as by collecting fluorescent photons incident on the objective lens and passing the fluorescent light back along the optical path to a light separation element such as a dichroic mirror which separates the fluorescent light from the reflected excitation light and directs the fluorescent light to a detector. Fluorescent light emitted in other directions, e.g., transmitted through the sample away from the objective lens, may be collected and detected. If desired, the system may also include elements for conventional laser scanning microscopy, such as a polarizing beam splitter for separating the reflected light at the excitation wavelength from the incoming laser light and directing such reflected light to a detector.

In the present invention, a dispersive prism is mounted adjacent to the output face of the acousto-optical detector to spatially compress the pulse which has been angularly spread by the acousto-optical deflector because of the spectral content of the pulse. The prism is preferably constructed so that the maximum correction is obtained at the center of the scanned angle. The beam exiting from the prism is directed to optical elements, such as lenses, which receive the output beam from the prism and direct it along the optical path to the objective lens of the microscope.

The optical path also preferably includes a mirror at the input side of the acousto-optical deflector which receives the beam on the optical path from the source and reflects it to the deflector. The relative angle between the mirror and the input face of the deflector are adjustable by mounting the mirror or the acousto-optical deflector, or both, to allow adjustment of the angular position between the face of the mirror and the input face of the acousto-optical deflector. The input angle to the acousto-optical deflector is preferably adjusted by appropriate adjustment of the angles between the mirror and the deflector so that the maximum diffraction efficiency (Bragg condition) is met at the desired wavelength of operation of the laser. However, the side wavelengths in the spectrum of the pulses will be somewhat Bragg-mismatched and thus attenuated. In this manner, the acousto-optical deflector also effectively acts as a spatial notch filter while allowing for the Bragg-matching of the center wavelength of the pulse. Utilization of an adjustable angle mirror combined with the input face of the acousto-optical deflector, and a dispersive prism mounted adjacent to the output face of the acousto-optical deflector, provide spatial compensation of the pulses with a minimum number of refractive elements and in a highly efficient and effective manner.

Further objects, features and advantages of the invention will be apparent from the following detailed description when taken in conjunction with the accompanying drawings.

DETAILED DESCRIPTION OF THE INVENTION

Figure 1:
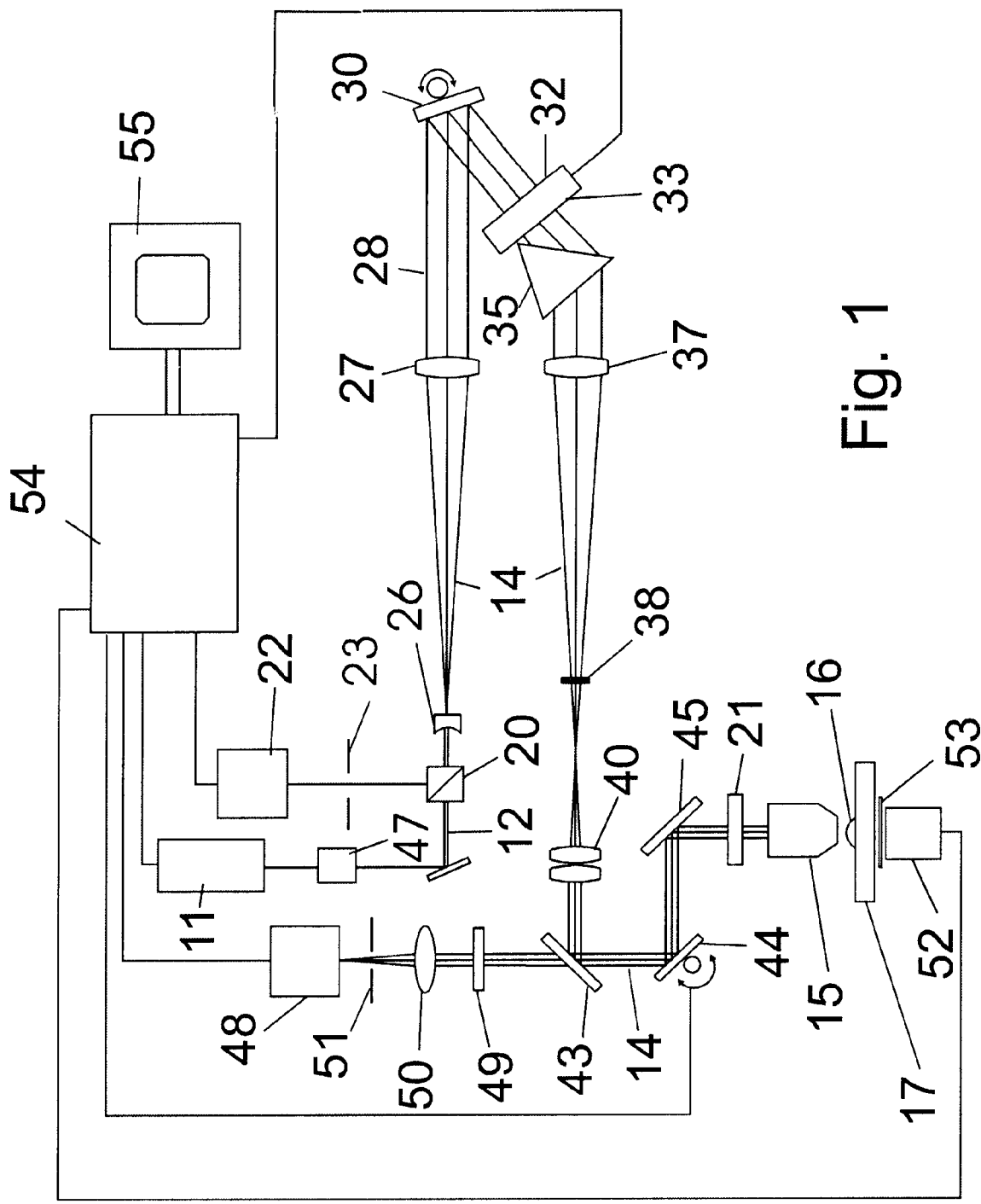
FIG. 1 is a simplified diagram of the optical layout of a laser scanning microscope system in accordance with the invention.
Figure 2:
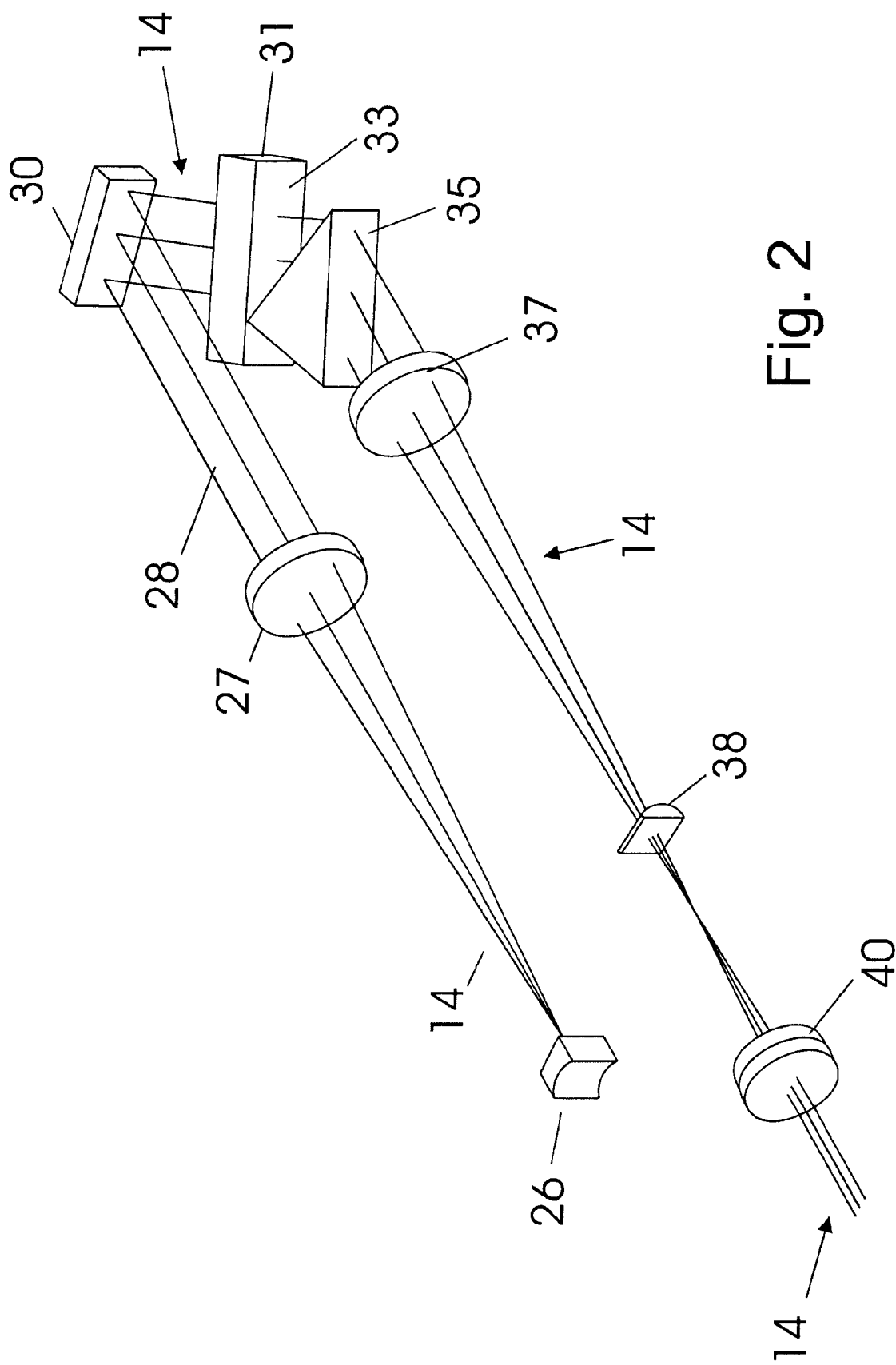
FIG. 2 is a simplified perspective view of the acousto-optical deflector and compensation optics along a portion of the optical path of the scanning system of FIG. 1.

With reference to the drawings, a laser scanning microscope system incorporating spatial compensation in accordance with the invention is shown generally at 10 in FIG. 1. The scanning microscope system 10 includes a light source 11 comprising a laser that provides short pulses (e.g., 5 picoseconds pulse width or less, and preferably 500 femtoseconds or less) of substantially monochromatic light at a desired wavelength. An example is a Ti:sapphire laser which puts out 100 to 200 femtosecond wide pulses. The center wavelength of the pulses is tunable. Other lasers with fixed and/or tunable wavelength output may also be used. For two photon excitation, the laser source 11 may, for example, provide excitation light at a nominal wavelength in the range of 800 nm. The laser light is provided in an output beam 12 which is directed along an optical path 14 by various optical elements to the objective lens 15 of a microscope which focuses the light on a specimen 16 held on a slide 17. For exemplification, the optical elements on the optical beam path may include a polarizing beam splitter 20 which can be utilized for conventional reflection scanning microscopy. A quarter-wave plate 21 would also be utilized in the optical path in a conventional manner. The polarizing beam splitter 20 transmits the input beam but reflects orthogonally polarized reflected light to a detector 22 (e.g., a photomultiplier tube), generally through an aperture in a confocal aperture plate 23. Although the present invention may be utilized with such a reflected light confocal scanning system, it is not an essential part of the present invention. The scanning system may be constructed as described in the U.S. patent to Haupt, et al. U.S. Pat. No. 4,863,226, the disclosure of which is incorporated by reference.

The laser light along the optical path 14 is also passed through a cylindrical lens 26 which expands the beam and directs it to a lens 27 which provides a collimated and expanded output beam 28 to a mirror 30. The mirror 30 reflects the beam to an acousto-optical deflector 31 which receives the beam at its input face 32. The beam exiting from the acousto-optical deflector 31 at its output face 33 is received by a compensating dispersive prism 35 which, as described further below, provides spatial compensation for the pulses passed through the acousto-optical deflector 31. The beam exiting from the prism 35 is passed through lenses 37 and 38 which refocus the laser beam back to a spherically symmetrical form. A set of lenses 40 re-collimates the beam and images the center of the acousto-optical deflector onto the microscope objective pupil. The collimated beam 41 passed from the lenses 40 is directed to a dichroic mirror 43, which reflects the wavelengths of the input beam light, and thence to a second deflector, e.g., a galvanometer driven mirror 44, which redirects the light on a path to the objective lens 15 (directly or via other optical elements such as a planar mirror 45). The acousto-optical deflector 31 is preferably utilized to provide rapid deflection of the light beam in a raster scan along the lines of the scan, with the galvanometer driven mirror 44 providing indexing of the lines of the raster scan from one line to another at a much slower rate than the deflections of the acousto-optical deflector 31.

The specimen 16 may contain fluorophores which absorb two (or more) photons at the relatively long wavelength (typically in the red to near-infrared region, e.g., 800 nm) of the light beam 12 and fluorescently emit a shorter wavelength photon. Some of the fluorescent photons are collected by the microscope objective lens 15 and are directed back on the optical path 14 to the dichroic mirror 43. The mirror 43 is selected to reflect the wavelength(s) of the light beam 12 and the reflected light from the specimen at the same wavelengths and to pass light at wavelengths shorter than a cut-off wavelength which is longer than that of the fluorescent photons emitted by the fluorophores. Generally, the laser light source provides a substantially monochromatic center wavelength in the near infrared to red region of the spectrum and the dichroic mirror 43 is formed to reflect light with wavelengths in the red to near infrared region of the spectrum and to pass light at a wavelength shorter than the source excitation wavelengths. The dichroic mirror 43 thus passes the fluorescent photons and directs them to a fluorescent light detector 48. Equivalently, the mirror 43 may be formed to reflect the fluorescent light wavelengths and pass the excitation beam wavelength. The mirror 43 is thus a light separation element that directs the light beam from the source along the beam path to the objective lens and directs the fluorescent light to the fluorescent light detector. The dichroic mirror 43 may be, e.g., a standard 700 nm Short Pass dichroic mirror available from Chroma Technology, Inc., that, operating at 45°, reflects wavelengths longer than 700 nm and transmits wavelengths shorter than 700 nm. Filters may also be used to separate the reflected light at the source wavelengths from the fluorescent light and such other light separation elements may be substituted for dichroic mirrors. Additional optical elements such as an excitation wavelength light barrier filter 49 and a lens 50 to focus the fluorescent light on the detector may also be used. Although generally not necessary, a confocal aperture plate 51 with a confocal aperture may be used to further block fluorescent light from outside the focal plane from reaching the detector 48. The dichroic mirror 43 may be located at other positions in the optical path if desired, including a position between the objective 15 and the galvanometer driven mirror 44. Fluorescent light emitted from the specimen 16 in directions other than toward the objective 15 may also be collected and detected. For example only, fluorescent light emitted through the transparent slide 17 may be collected and detected by a detector 52, (e.g., a photomultiplier tube) with a filter 53 used to filter out excitation (source) wavelength light. A fluorescent light detector or detectors may be mounted adjacent to the slide 17 to collect and detect fluorescent light or a fiber optic cable, etc., may be used to direct fluorescent light from the specimen to a detector.

It is understood that the components of the system 10 are controlled and information from the detectors 22, 48 and 52 is processed in a control module 54, typically incorporating a computer workstation, in a conventional manner in commercially available scanning systems (e.g., an OZ™ confocal laser scanning microscope, Noran Instruments, Inc., Middleton, Wis.). The image obtained from the information from the detectors 22, 48 and 52 may be displayed on a video terminal 55, printed out on a printer, stored for later display or processing, etc.

Conventional scanning systems that utilize AODs have lenses or prisms at the input and output sides of the AOD. Normally, efficient Bragg diffraction of a multichromatic light beam requires some kind of chromatic correction, such as by the use of prisms, so that all wavelengths nearly Bragg-match the angle of incidence for nearly equal diffraction efficiencies. In the present invention, conventional Bragg-matching prisms of the type located adjacent to the input and output faces of the deflector 31 are preferably not used. The mirror 30 and the acousto-optical deflector 31 preferably are mounted in accordance with the invention so that the face of the mirror and the input face 32 of the acousto-optical deflector 31 can be adjusted relative to each other. The mirror 30 is preferably mounted about an axis for rotational adjustment, but the AOD 31 may alternatively (or additionally) be mounted to rotate to adapt its angular position. These elements can be adjusted, e.g., by rotation about an axis parallel to faces of the devices, to positions such that the laser beam intersects the input face at an angle to match the Bragg condition for maximum diffraction efficiency at the center wavelength of the laser light. The adjustability of the mirror 30 (or AOD 31 or both) allows the angle of incidence on the AOD input face 32 to be selected so that the maximum diffraction efficiency—the Bragg condition—is met at the desired wavelength of operation. This is particularly useful for tunable laser sources so that the same AOD arrangement can be used to operate over a range of nominal laser wavelengths. For example, the Bragg angle for pulses centered at 750 nm is 93.75% of the Bragg angle for pulses centered at 800 nm, and the mirror 30 can be rotated to adjust the angle of incidence accordingly. Alternatively, the AOD may itself be rotated by the same amount in the opposite direction. However, the Bragg mismatch at the side-band wavelengths effectively acts as a spectral band-pass filter at the input to the AOD and thus limits the extent of the spatial (angular) spread of the AOD-deflected pulsed beam. In the present invention, the use of dispersive elements, such as prisms, on the input side of the AOD would not be preferred. If such an element were used, for example, to spread the spectral components apart to take advantage of the "band-pass" filter at the AOD because of the resulting Bragg mismatching, doing so would also increase the angular spread at the output side and therefore negate the compressing role of the output side prism 35. If, alternatively, a prism is used (in a conventional manner) to better Bragg-match the various wavelengths at the input side of the AOD, then the band-pass filtering provided by the AOD would be reduced.

The utilization of the output side compensating prism 35 and the input side mirror 30 does not significantly affect the performance of the system 10 when used for conventional reflection or fluorescence confocal microscopy using continuous wave (CW) lasers. Since confocal microscopy generally uses illumination light at different wavelengths than those used for multi-photon fluorescence, the relative angular position of the mirror 30 and the AOD deflector 31 need to be adjusted when a switch is made between these modes. Alternatively, the mirror 30 or the compensating prism 35 or both may be mounted to be displaced out of the beampath for replacement by conventional elements, if desired.

The prism 35 provides spectral compensation by converging the spectrally spread parts of the pulse. The prism is preferably a triangular shape so that the maximum correction is obtained at the center of the scan angle. As an example of the present invention, the laser source may provide a 20 nm wide pulse at 800 nm wavelength. The deflection angle of the output of the acousto-optical deflector is:

$$\theta_B = \frac{\lambda f}{2V}$$

where λ represents the wavelengths in the pulse (e.g., 789 nm<λ<811 nm for a beam centered at 800 nm), f is the acoustic modulation frequency of the acousto-optical deflector, and V is the speed of the acoustic wave traversing the acousto-optical deflector crystal. For a $TeO_2$ acousto-optical deflector, V=4322 m/s, and 200 MHz<f<400 MHz. At 300 MHz, a 20 nm-pulse will be spread across about 0.04° by the acousto-optical deflector. Utilizing a thin prism approximation, the total deflection δ by a prism of angle α, is:

$$\delta \approx (n(\lambda)-1)\alpha$$

Thus, by utilizing the prism 35 to merge the angle of deflection at the lower end of the prism, e.g. at the 790 nm side, with that of the higher end of the pulse, e.g. 810 nm, using SF10 material from the Schott Glass Company, a triangular prism 35 with a prism angle of 38.8° (at the apex of a triangular prism) is needed to correct the 0.04° spread caused by the acousto-optical deflector at the center of the scan. SF10 glass is a highly dispersive (low V number, e.g., Vd=28.41) medium which allows a relatively small prism angle. A smaller angle is preferred since the smaller the prism angles, the less aberrations are introduced in the optical beam. Other materials with appropriate prism angles can be used if desired. For example, using SF11 material from Schott Glass Company an appropriate prism angle would be 48° to obtain the same correction.

For utilization of infrared pulses having pulse widths in the range of a few picoseconds or less, it is also preferred that the optics along the optical path be adapted for such systems. An external pre-compensator 47 of conventional design may be utilized to provide pre-compression of the pulses from the laser 11 temporally to counteract the temporal spread introduced by the optical elements along the optical path 14. A typical pre-compensator utilizes a two-prism and retroreflector arrangement and commercially available units may be used. All of the various optical elements are preferably ultrafast optics suited for use at the near-infrared wavelengths in the light from the laser source 11. The various mirrors are preferably provided with highly reflective near-infrared and visible coatings. The dichroic mirror 40 is selected to transmit visible and reflect near-infrared light (or vice versa).

It is understood that the invention is not confined to the embodiments set forth herein as illustrative, but embraces such modified forms thereof as come within the scope of the following claims.

What is claimed is:

1. A laser scanning system for use with an optical microscope comprising:
   (a) a laser light source emitting a pulsed light beam;
   (b) a fluorescent light detector;
   (c) optical elements forming an optical path from the light source to a position from which the beam may be received by an objective lens of a microscope and focussed on a specimen and such that light reflected or emitted from the specimen is received by the objective lens and returned on the optical path, the optical elements including an acousto-optical deflector and a second deflector arranged to scan the laser light beam in an X and Y direction onto the specimen, means for directing fluorescent light emitted from the specimen at a different wavelength than the wavelength of the laser light source on a path to the fluorescent light detector, the acousto-optical deflector having an input face which receives the light beam from the laser light source and an exit face from which the light beam exits the acousto-optical deflector, and a dispersive prism mounted to receive the beam exiting from the exit face of the acoustic-optical deflector and to converge the spectral components of the beam exiting from the acousto-optical deflector caused by spatial dispersion of wavelengths in the light beam.

2. The system of claim 1 wherein the optical elements forming the optical path further includes a mirror positioned to deflect the beam from the laser light source to the input face of the acousto-optical deflector, and wherein the mirror and the acousto-optical deflector are mounted for adjustment relative to one another to allow the angle of incidence of the light beam on the input face of the acousto-optical deflector to be adjusted thereby to allow the beam incident on the input face of the acousto-optical deflector to be at an angle to match the Bragg condition for maximum diffraction efficiency for the center wavelength of the light beam.

3. The system of claim 1 wherein the dispersive prism is a triangular prism.

4. The system of claim 1 wherein the dispersive prism is arranged such that the maximum correction is at the center of the scanned angle.

5. The system of claim 1 further including a confocal aperture plate positioned ahead of the fluorescent light detector to pass fluorescent light in the optical path back to the detector that is substantially only in the plane of focus of the objective lens.

6. The system of claim 1 wherein the second deflector comprises a galvanometer driven mirror.

7. The system of claim 1 wherein the laser light source provides a substantially monochromatic output beam having a wavelength in the near infrared to red region of the spectrum and wherein the means for directing fluorescent light includes a dichroic mirror arranged in the optical path to direct the beam from the laser light source on the optical path to the objective lens and specimen and formed to reflect light at wavelengths in the red to near infrared region of the spectrum and to pass light at a wavelength shorter than the source light beam wavelengths.

8. The system of claim 1 wherein the laser light source provides an output beam that is modulated in pulses with pulse widths of 5 picoseconds or less.

9. The system of claim 8 wherein the pulse width in the beam from the laser light source is 500 femtoseconds or less.

10. The system of claim 1 further including a reflected light detector selected to detect wavelengths of light in the beam from the laser light source, and wherein the optical elements in the optical path further include a polarizing beam splitter receiving the light from the source and transmitting polarized light of a first orientation onto the beam path to the specimen, and wherein light returned from the specimen is orthogonally polarized and is reflected by the polarizing beam splitter to the reflected light detector.

11. The system of claim 10 further including a confocal aperture plate with aperture positioned before the reflected light detector to pass light through the aperture corresponding to light in the focal plane of the objective lens of the microscope.

12. A laser scanning system for use with an optical microscope comprising:
   (a) a laser light source emitting a pulsed light beam;
   (b) a fluorescent light detector;
   (c) optical elements forming an optical path from the light source to a position from which the beam may be received by an objective lens of a microscope and focussed on a specimen and such that light reflected or emitted from the specimen is received by the objective lens and returned on the optical path, the optical elements including an acousto-optical deflector and a second deflector arranged to scan the laser light beam in an X and Y direction onto the specimen, a light separation element arranged in the optical path to direct the beam from the laser light source on the optical path to the objective lens and specimen and to direct fluorescent light emitted from the specimen at a different wavelength than the wavelength of the laser light source on a path to the fluorescent light detector, the acousto-optical deflector having an input face which receives the light beam from the laser light source and an exit face from which the light beam exits the acousto-optical deflector, a dispersive prism mounted to receive the beam exiting from the exit face of the acoustic-optical deflector and to converge spectral components of the beam exiting from the acousto-optical deflector caused by spatial dispersion of wavelengths in the light beam, and a mirror positioned to deflect the beam from the laser light source to the input face of the acousto-optical deflector and wherein the mirror and the acousto-optical deflector are mounted for adjustment relative to one another to allow the angle of incidence of the light beam on the input face of the acousto-optical deflector to be adjusted, thereby to allow the beam incident on the input face of the acousto-optical deflector to be at an angle to match the Bragg condition for maximum diffraction efficiency for the center wavelength of the light beam.

13. The system of claim 12 wherein the dispersive prism is a triangular prism.

14. The system of claim 12 wherein the dispersive prism is arranged such that the maximum correction is at the center of the scanned angle.

15. The system of claim 12 further including a confocal aperture plate positioned ahead of the fluorescent light detector to pass fluorescent light on the optical path back to the detector that is substantially only in the plane of focus of the objective lens.

16. The system of claim 12 wherein the second deflector comprises a galvanometer driven mirror.

17. The system of claim 12 wherein the laser light source provides a substantially monochromatic output beam having a wavelength in the near infrared to red region of the spectrum and wherein the light separation element is a dichroic mirror formed to reflect light at wavelengths in the red to near infrared region of the spectrum and to pass light at a wavelength shorter than the source light beam wavelengths.

18. The system of claim 12 wherein the laser light source provides an output beam that is modulated in pulses with pulse widths of 5 picoseconds or less.

19. The system of claim 18 wherein the pulse width in the beam from the laser light source is 500 femtoseconds or less.

20. The system of claim 12 further including a reflected light detector selected to detect wavelengths of light in the beam from the laser light source, and wherein the optical elements in the optical path further include a polarizing beam splitter receiving the light from the source and transmitting polarized light of a first orientation onto the beam path to the specimen, and wherein light returned from the specimen is orthogonally polarized and is reflected by the polarizing beam splitter to the reflected light detector.

21. The system of claim 20 further including a confocal aperture plate with an aperture positioned before the reflected light detector to pass light through the aperture corresponding to light in the focal plane of the objective lens of the microscope.

22. A laser scanning multi-photon microscope system comprising:
(a) a laser light source emitting a pulsed light beam;
(b) a microscope objective lens;
(c) a reflected light detector;
(d) a fluorescent light detector;
(e) optical elements forming an optical path from the light source to a position from which the beam may be received by the objective lens of the microscope and focussed on a specimen and such that light reflected or emitted from the specimen is received by the objective lens and returned on the optical path, the optical elements including an acousto-optical deflector and a second deflector arranged to scan the laser light beam in an X and Y direction onto the specimen, and a light separation element arranged in the optical path to direct the beam from the laser light source on the optical path to the objective lens and specimen and to direct fluorescent light emitted from the specimen at a different wavelength than the wavelength of the laser light source on a path to the fluorescent light detector, the acousto-optical deflector having an input face which receives the light beam from the laser light source and an exit face from which the light beam exits the acousto-optical deflector, a dispersive prism mounted to receive the beam exiting from the exit face of the acoustic-optical deflector and to converge spectral components of the beam exiting from the acousto-optical deflector caused by spatial dispersion of wavelengths in the light beam, a mirror positioned to deflect the beam from the laser light source to the input face of the acousto-optical deflector and wherein the mirror and the acousto-optical deflector are mounted for adjustment relative to one another to allow the angle of incidence of the light beam on the input face of the acousto-optical deflector to be adjusted thereby to allow the beam incident on the input face of the acousto-optical deflector to be at an angle to match the Bragg condition for maximum diffraction efficiency, and a polarizing beam splitter receiving the light from the source and transmitting polarized light of a first orientation on the optical path to the specimen, and wherein reflected light returned from the specimen is orthogonally polarized with respect to the first orientation and is reflected by the polarizing beam splitter to the reflected light detector.

23. The system of claim 22 wherein the dispersive prism is a triangular prism.

24. The system of claim 22 wherein the dispersive prism is arranged such that the maximum correction is at the center of the scanned angle.

25. The system of claim 22 further including a confocal aperture plate positioned ahead of the florescent light detector to pass fluorescent light on the optical path back to the detector that is substantially only in the plane of focus of the objective lens.

26. The system of claim 22 wherein the second deflector comprises a galvanometer driven mirror.

27. The system of claim 22 wherein the laser light source provides a substantially monochromatic output beam having a wavelength in the near infrared to red region of the spectrum and wherein the light separation element is a dichroic mirror formed to reflect light at wavelengths in the red to near infrared region of the spectrum and to pass light at a wavelength shorter than the source light beam wavelengths.

28. The system of claim 22 wherein the laser light source provides an output beam that is modulated in pulses with pulse widths of 5 picoseconds or less.

29. The system of claim 28 wherein the pulse width in the beam from the laser light source is 500 femtoseconds or less.

30. The system of claim 22 further including a confocal aperture plate with an aperture positioned before the reflected light detector to pass light through the aperture corresponding to light in the focal plane of the objective lens of the microscope.

31. A method of multi-photon fluorescence microscopy comprising:
(a) passing a pulsed light beam from a laser source through an acousto-optical deflector to deflect the beam in a pattern over an objective lens of a microscope to focus the light on a specimen and excite multi-photon fluorescence emissions from a fluorophore in the specimen;

(b) collecting fluorescent light emitted from the specimen and directing such fluorescent light to a fluorescent light detector; and (c) passing the pulsed light beam exiting from the acousto-optical deflector through a dispersive prism to converge spectral components of the beam exiting from the acousto-optical deflector caused by spatial dispersion of wavelengths in the light beam introduced by the pulse modulation of the light beam.

32. The method of claim 31 further comprising reflecting the light beam with a mirror positioned adjacent to an input face of the acousto-optical deflector, and adjusting the relative position of the mirror and the input face of the acousto-optical deflector such that the beam is incident on the input face of the acousto-optical deflector at an angle which matches the Bragg condition for maximum diffractive efficiency at the center wavelength of the light beam from the laser source and such that the acousto-optical deflector attenuates both sides of the spectrum of the light beam pulses which are mismatched to the Bragg condition.

33. A method of multi-photon fluorescence microscopy comprising:

(a) passing a pulsed light beam from a laser source through an acousto-optical deflector to deflect the beam in a pattern over an objective lens of a microscope to focus the light on a specimen and excite multi-photon fluorescence emissions from a fluorophore in the specimen;

(b) collecting fluorescent light emitted from the specimen and directing such fluorescent light to a fluorescent light detector; and (c) reflecting the light beam with a mirror positioned adjacent to an input face of the acousto-optical deflector, and adjusting the relative position of the mirror and the input face of the acousto-optical deflector such that the beam is incident on the input face of the acousto-optical deflector at an angle which matches the Bragg condition for maximum diffractive efficiency at the center wavelength of the light beam from the laser source and such that the acousto-optical deflector attenuates both sides of the spectrum of the light beam pulses which are mismatched to the Bragg condition.

* * * * *